United States Patent [19]

Francis et al.

[11] Patent Number: 4,652,384

[45] Date of Patent: Mar. 24, 1987

[54] HIGH TEMPERATURE DRILLING FLUID COMPONENT

[75] Inventors: H. Paul Francis, Homewood; Edward D. DeBoer, Sauk Village; Vilas L. Wermers, Lemont, all of Ill.

[73] Assignee: American Maize-Products Company, Hammond, Ind.

[21] Appl. No.: 645,546

[22] Filed: Aug. 30, 1984

[51] Int. Cl.$^4$ ............................................. C09K 3/00
[52] U.S. Cl. .................................... 252/8.51; 252/8.5; 106/200; 106/217; 536/106; 523/130; 166/282
[58] Field of Search ..................... 252/8.5 A, 8.5 C; 523/130; 166/282; 536/106; 106/200, 217

[56] References Cited

U.S. PATENT DOCUMENTS

| | | | |
|---|---|---|---|
| 3,032,498 | 5/1962 | Walker | 252/8.5 C |
| 3,033,852 | 5/1962 | Paschall | 252/8.5 C |
| 3,208,526 | 9/1965 | Patton et al. | 166/38 |
| 3,243,000 | 3/1966 | Patton et al. | 252/8.5 C |
| 3,256,115 | 6/1966 | Stearns et al. | 127/32 |
| 3,872,018 | 3/1975 | Alexander | 252/8.5 A |
| 3,953,336 | 4/1976 | Daigle | 252/8.5 |
| 3,993,570 | 11/1976 | Jackson et al. | 252/8.5 |
| 4,003,838 | 1/1977 | Jackson et al. | 252/8.5 |
| 4,090,968 | 6/1978 | Jackson et al. | 252/8.5 |
| 4,422,947 | 12/1983 | Dorsey et al. | 252/8.5 C |

OTHER PUBLICATIONS

D. C. Thomas, "Thermal Stability of Starch and Carboxymethyl Cellulose Polymers Used in Drilling Fluids", SPE 8463.
Cloud & Clark, "Stimulation Fluid Rheology III. Alternatives to the Power Law Fluid Model for Cross-Linked Fluids", SPE 9332.
Conway, Pauls & Harris, "Evaluation of Procedures and Instrumentation Avaliable for Time-Temperature Stability . . . ", SPE 9333.
Conway et al, "Chemical Model for the Rheological Behavior of Crosslinked Fluid Systems", SPE 9334.
Chemstar Bulletin, Oct. 1982, "Exstar: High Temperature Polymer for Salt Brine Fluids".

Primary Examiner—A. Lionel Clingman
Assistant Examiner—John F. McNally
Attorney, Agent, or Firm—Lucas & Just

[57] ABSTRACT

What is disclosed is a cross-linked starch which provides better fluid loss control in well drilling fluids than conventional starches at elevated temperatures. The starch may be derived from any source.

14 Claims, No Drawings

HIGH TEMPERATURE DRILLING FLUID COMPONENT

This invention relates to an improved cross-linked starch which is used in well drilling fluids.

In drilling wells, a mud-like fluid is pumped into the hole to clean and cool the drill bit and to flush to the surface the rock cuttings that are torn loose by the drill bit. The drilling fluid must have certain physical characteristics. The most important of these is the viscosity and the water holding or retaining characteristics of the fluid.

The use of starch in well drilling fluid is well known. It is also well known that conventional starches tend to break down at elevated temperatures for extended periods of time. Specifically, conventional starch tends to break down or burn up at temperatures of 225° F. or higher when subject to that temperature for longer than four hours. High temperatures for extended periods of time are often encountered in deeper wells during the drilling process. The breakdown of conventional starch results in an increase in the consumption of the conventional starch needed in the mud.

There is a need in the well drilling industry for a starch which can operate for extended periods of time at elevated temperatures. The present invention provides such a starch.

The present invention is a cross-linked starch which resists degradation at elevated temperatures over extended periods of time and thus allows a reduction in the amount of overall starch consumed in drilling a well. The decrease in the amount of starch used can lead to an economic advantage for the user. Specifically, the starch of the present invention has been found to function satisfactorily after exposure to temperatures at or above 250° F. for periods of up to thirty-two hours.

Well drilling fluid will be referred to as mud, drill fluid, drilling fluid, oil well fluid and oil well drilling fluid throughout this application. It will be understood that these terms refer to a fluid which is pumped into a well during the drilling operation. The well itself may be for gas, oil or any other purpose where a well drilling fluid is used.

The starch of the present invention demonstrates improved fluid retention for periods in excess of four hours at elevated temperatures. In fact, it has been discovered that the starch of the present invention is activated by high temperature over extended periods of time and thus does not reach peak efficiency until it is subjected to elevated temperatures over extended periods of time. Thus, where it would be thought that a conventional starch would start to break down, at temperatures in excess of 225° F. for periods greater than four hours, the starch of the present invention actually starts to work.

It is normal for most starches when first introduced into the hole during drilling operations to provide a water retention capability. The delayed activation of the starch of the present invention causes the starch of the present invention to exhibit a poorer initial water retention than conventional oil well drilling starch. This delayed activation would cause one to disregard the starch of the present invention as an acceptable oil well drilling fluid starch if it is tested at room temperature without the proper amount of prior heating.

Typically the user starts drilling with a conventional oil well drilling starch and when consumption of the conventional starch becomes excessive due to conditions in the well, the starch of the present invention can be used.

To obtain the cross-linked starch of the present invention, a cross-linking agent is reacted with granular starch in an aqueous slurry. The cross-linking reaction is controlled by a Brabender Viscometer test. Starches of the present invention are obtained when the initial rise of the viscosity of the product is observed to occur between 104° and 144° C., and the viscosity of the product does not rise above 200 Brabender Units at temperatures less than 130° C.

The cross-linked starch slurry is then drum-dried and milled to obtain a dry product. The effectiveness of the product is checked by the American Petroleum Institute (API) Fluid Loss Test after static aging of sample drilling fluids containing the starch at elevated temperatures. The milled dry product can then be incorporated into the oil well drilling fluid of the drill site.

The starch used in the slurry can be from any source. Typical sources of starch are wheat, potato, rice, corn and roots containing a high starch content. It is well known that "starch" can also refer to common starch, which contains both amylose and amylopectin molecules, or waxy starch, which is virtually all amylopectin molecules. The preferred starch source is corn.

To a starch slurry containing at least 25% by weight starch granules in water, a cross-linking agent is added. The cross-linking agent is a polyfunctional reagent such as phosphorus oxychloride, epichlorohydrin, cyanuric chloride, formaldehyde or others. The preferred cross-linking agent is phosphorus oxychloride. The actual methods of cross-linking the starch are well known within the art.

The amount of the cross-linking agent used will depend upon the reagent used, the reaction conditions and the starch used. Cross-linking is optimized in a known manner for each starch to obtain the advantage of oil well drilling mud fluid retention of the present invention.

After reaction with the selected cross-linking reagent, the cross-linked starch is dried. The drying can be accomplished by a heated drum dryer or extruder. It is preferred that the starch granules are gelatinized either partially or completely when dried in the known manner.

The dried product is then milled to a particle size conventionally used in oil well drilling muds. Any conventional milling process can be used.

At the oil well drilling site, the starch of the present invention is incorporated into the mud when the consumption of the conventional starch becomes excessive. The mud is prepared in a conventional manner with the addition of the starch of the present invention.

In general, oil well mud is prepared by combining clay, brine and starch at the site prior to pumping it into the hole. The proportions of the starch, clay and brine used in the mud are well known in the art, as are the methods used to combine them.

Brine is a generic term for water containing a salt such as a sodium, potassium, or calcium salt. Clay is also a generic term for an earthy material which is composed of mainly fine particles of aluminum silicates and other minerals. It will be understood that any type of brine or clay may be employed with the starch of the present invention. The specific make-up of brine and clay is well known in the art.

In addition to the soluble salt in water, clay and the starch of the present invention, oil well fluid may contain other conventional additives. It will be understood that not all of the possible additives will be present in any one oil well fluid but their selection and use will differ for different drilling operations and each operator will use different additives depending on the situation.

It may also be possible to use the starch of the present invention with water and clay in the absence of brine or in a brine environment free of clay when making a well drilling fluid.

It will be understood that in practice the amount of starch added to the mud will be different for different drilling operations and each operator will use a particular amount which he believes to be superior. In general, the amount of starch employed in the drilling fluid will not exceed about 4 or 5 pounds per barrel of the drilling fluid. More starch may of course be used but there is normally no economic advantage to doing so.

Starch of the present invention may be introduced into the hole in any number of ways known to those skilled in the art. Starch of the present invention may be combined with brine and clay and then added to mud made from conventional starch at the drill site prior to pumping it into the drill hole. Or, starch of the present invention may be added directly to a mud which contains conventional starch and the mud containing both starches can be pumped into the drill hole.

It is possible to employ the starch of the present invention with an initial wet drilling fluid which does not contain starch. In other words, an operator could start the drilling operation with a well fluid which does not contain starch and still employ the starch of the present invention in drilling that well.

The exact chemistry of the activation and breakdown rate of the present invention is not totally understood. It has been determined that the starch of the present invention needs an activation period. The activation period is determined by the temperature to which the starch is subjected and the amount of time the starch is subject to that temperature. A lower temperature will require a longer period to activate the starch while a higher temperature will require less time.

BRABENDER VISCOMETER TEST

The following is the method employed for the Brabender Viscometer tests and is the definition of the Brabender Viscometer test used herein. A Brabender Viscometer is a standard viscometer readily available on the open market and well known to those skilled in the art.

1. A sample of starch of the present invention, prior to gelatinization on a drum-dryer or extruder, is slurried in water to 5.5% solids content by weight.
2. The sample is transferred to the Brabender cup. The cup is then inserted into the viscometer. The viscometer is completely enclosed in a pressure vessel. The viscometer is then turned on, the pressure vessel closed and pressurized to 50 psi with air.
3. The heater is set such that the temperature of the sample rises at 1.5° C. per minute. The temperature continues to rise until 145° C. is reached.
4. The sample is then held at 145° C. until 200 viscosity units (Brabender Units, BU) are reached or until 20 minutes has passed whichever comes first.
5. The starch of the present invention shows a viscosity rise towards 200 Brabender Units at a temperature between 104° and 144° C., and does not reach 200 Brabender Units of viscosity at temperatures less than 130° C.

AMERICAN PETROLEUM INSTITUTE FLUID LOSS TEST

The following procedure was employed for preparing and testing an oil well drilling fluid by the American Petroleum Institute (API) Fluid Loss Test. This method was employed for all the API Fluid Loss values given herein.

1. To prepare a saturated salt water, 6300 grams of salt was added to 15,750 mls. of distilled water. The salt was food grade salt specifically salt number 999 sold by Stroll and Sons, Portland, Oreg.
2. While stirring the saturated salt water, 551.25 grams of attapulgite clay was added. Stirring was continued for 30 minutes, interrupted at least twice to scrape any adhering particles from the walls of the container. A defoamer was not used. The attapulgite clay was salt gel attapulgite clay sold by Basco.
3. While stirring one barrel-equivalent (350 ml.) of the base mud with a Hamilton Beach multimixer, 5 grams (each gram of starch per 350 ml. of base mud being equivalent to one pound of starch per barrel of mud) of starch was added and the mud was mixed for 20 minutes, interrupting the stirring twice again to scrape any adhering particles from the walls of the container.
4. The sample was placed in a 250 ml. pyrex liner. The pyrex liner was placed into an aluminum-bronze aging cell. The cell was closed and 200 psi of nitrogen pressure was applied to the cell. The cell was sealed and placed in a preheated oven at the testing temperature for the predetermined amount of time. Multiple samples were aged in the same oven, at the same time, to eliminate as many variables as possible.
5. After aging for a selected period of time, the cells were removed from the oven, cooled and opened. The samples were stirred on a multi-mixer for twenty minutes.
6. The rheological properties of the fluid were determined using a Fann 35 Viscometer.
7. The samples were transferred to the API Fluid Loss filter cells and the API Fluid Loss at 100 psi for 30 minutes was determined. The API test is a standard test run in the industry and is well known to those skilled in the art.
8. The method entailed the use of separate mud samples for each time-temperature combination, to avoid the effects of heating and cooling a sample several times.

These and other features of the present invention are demonstrated in the examples that follow.

EXAMPLE 1

This example illustrates one preferred method of making the starch of the present invention.

To a slurry of waxy corn starch containing 49,400 lbs. of starch, sodium hydroxide was added to a titer of 19.5 ml. of 0.1N hydrochloric acid per 25 ml. of slurry. Then 138 lbs. of phosphorus oxychloride ($POCl_3$) was added over a period of 90 minutes. Thirty minutes after the $POCl_3$ was added, the slurry was neutralized to a pH of 5.74. The cross-linked starch when subjected to the Brabender Viscometer Test gave a rise in viscosity toward 200 Brabender Units at 140° C. The product was then pregelatinized and dried with a heated drum dryer and subsequently milled.

EXAMPLE 2

The starch prepared in accordance with Example 1 was used in this example. This example shows the improvement in stability of the fluid loss of simulated drilling fluids after static aging at 275° F. as imparted by the starch of the present invention. The fluid loss values listed in Table I were obtained from a saturated salt plus attapulgite mud system, using a starch concentration of 5 pounds per barrel.

TABLE I

| Static Aging Time (Hours) at 275° F. | API Fluid Loss | |
|---|---|---|
| | Conventional Starch Fluid Loss (ml) | Starch of Example I Fluid Loss (ml) |
| 4 | 6.8 | 33.4 |
| 8 | 8.4 | 7.6 |
| 12 | 19.0 | 5.4 |
| 16 | 31.0 | 7.2 |
| 20 | 51.0 | 18.0 |
| 24 | 153.0 | 56.0 |

It is readily apparent that the stability of the fluid loss of the starch of the present invention is superior to that of the conventional starch from the eight hour point to the twenty-four hour point.

EXAMPLE 3

This example shows the improvement in stability of the fluid loss of simulated drilling fluids after static aging at 250° F. as imparted by the starch of the present invention. The fluid loss values listed in Table II were obtained from a saturated salt plus attapulgite mud system, using a starch concentration of 5 pounds per barrel.

TABLE II

| Static Aging Time (Hours) at 250° F. | API Fluid Loss | |
|---|---|---|
| | Conventional Starch Fluid Loss (ml) | Starch of Example I Fluid Loss (ml) |
| 8 | 4.6 | 24.0 |
| 12 | 6.6 | 6.2 |
| 16 | 8.8 | 6.4 |
| 20 | 8.4 | 6.0 |
| 24 | 12.2 | 6.4 |
| 28 | 18.2 | 5.4 |
| 32 | 19.1 | 6.8 |

It is readily apparent that the stability of the fluid loss of the starch of the present invention is superior to that of the conventional starch after the twelve hour point.

EXAMPLE 4

This example illustrates the use of another starch source for a starch of the present invention.

To a slurry of common starch containing 31.5 lbs. of starch, sodium hydroxide was added to a titer of 18.5 of 0.1N hydrochloric acid per 25 ml. of slurry. Then 18.14 grams of POCl$_3$ was added. Thirty minutes after all the POCl$_3$ was added, the slurry was neutralized with hydrochloric acid. The cross-linked starch when subjected to the Brabender Viscometer Test gave a rise in viscosity toward 200 Brabender Units after 143° C. temperature was reached. The product was pregelatinized and dried with a heated drum dryer and subsequently milled.

The API fluid loss test showed after 16 hours at 275° F. in a saturated salt plus attapulgite drilling fluid with a starch concentration of 5 pounds per barrel, the fluid loss for this product was 21.6 ml. vs. 28.5 ml. for conventional starch.

EXAMPLE 5

This example illustrates the use of a starch blend to make a starch of the present invention.

To a slurry containing 15.75 lbs. of common corn starch and 15.75 lbs. of waxy corn starch, sodium hydroxide was added to a titer of 18.5 ml. of 0.1N hydrochloric acid per 25 ml. of slurry. Then 18.14 grams of POCl$_3$ was added. Thirty minutes after all the POCl$_3$ was added, the slurry was neutralized with hydrochloric acid.

The cross-linked starch when subjected to the Brabender Viscometer Test gave a rise toward 200 Brabender Units at 134° C. The product was pregalatinized and dried with a heated drum dryer and subsequently milled.

The API fluid loss test showed that after 16 hours at 275° F. in a saturated salt plus attapulgite drilling fluid with a starch concentration of 5 pounds per barrel, the fluid loss for this product was 11.4 ml. vs. 28.5 ml. for conventional starch.

It will be understood that this patent is intended to include all changes and modifications of the embodiments of the invention herein described for the purposes of illustration which do not constitute a departure from the spirit and scope of the invention.

What is claimed is:

1. Cross-linked starch for use in well drilling fluid which when subjected to a Brabender Viscometer test as herein described exhibits a viscosity rise toward 200 Brabender Units at a temperature between 104° and 144°, and does not exhibit a viscosity of greater than 200 Brabender Units at temperatures less than 130° C. and which when subjected to an American Petroleum Institute Fluid Loss Test exhibits a decrease in fluid loss between four hours and eight hours at about 275° F.

2. The cross-linked starch of claim 1 wherein the cross-linked starch is derived from waxy corn.

3. A cross-linked starch for use in well drilling fluid comprising a cross-linked starch which exhibits an API fluid loss of less than 25.0 ml. after 20 hours of exposure to 275° F. in a saturated salt plus attapulgite drilling fluid at a concentration of 5 pounds of starch per barrel of drilling fluid and which when subjected to an American Petroleum Institute Fluid Loss Test exhibits a decrease in fluid loss between four hours and eight hours at about 275° F.

4. A cross-linked starch for use in well drilling fluid comprising a cross-linked starch which exhibits a fluid loss of less than 18.0 ml. after 32 hours of exposure to 250° F. in a saturated salt plus attapulgite drilling fluid at a concentration of 5 pounds of starch per barrel of drilling fluid and which when subjected to an American Petroleum Institute Fluid Loss Test exhibits a decrease in fluid loss between four hours and eight hours at about 275° F.

5. A well drilling fluid having as an essential component thereof the cross-linked starch of claim 1.

6. A well-drilling fluid having as an essential component thereof the cross-linked starch of claim 2.

7. A well drilling fluid having as an essential component thereof the cross-linked starch of claim 3.

8. A well drilling fluid having as an essential component thereof the cross-linked starch of claim 4.

9. A method of making a well drilling fluid comprising adding to a mixture of clay and brine the cross-linked starch of claim 1.

10. A method of making a well drilling fluid comprising adding to a well drilling fluid made with conventional starch, clay and brine the cross-linked starch of claim 1.

11. The cross-linked starch of claim 1 wherein the starch is cross-linked by reacting the starch with a cross-linking agent wherein said cross-linking agent is selected from the group consisting of phosphorous oxychloride, epichlorohydrin, cyanuric chloride and formaldehyde.

12. The cross-linked starch of claim 2 wherein the starch is cross-linked by reacting the starch with a cross-linking agent wherein said cross-linking agent is selected from the group consisting of phosphorous oxychloride, epichlorohydrin, cyanuric chloride and formaldehyde.

13. The cross-linked starch of claim 3 wherein the starch is cross-linked by reacting the starch with a cross-linking agent wherein said cross-linking agent is selected from the group consisting of phosphorous oxychloride, epichlorohydrin, cyanuirc chloride and formaldehyde.

14. Cross-linked starch for use in well drilling fluid which when subjected to a Brabender Viscometer test as herein described exhibits a viscosity rise toward 200 Brabender Units at a temperature between 104° and 144° C., and does not exhibit a viscosity of greater than 200 Brabender Units at temperatures less than 130° C. and which when subject to an American Petroleum Institute Fluid Loss Test at about 275° F. has a decrease in fluid loss between about 4 to about 8 hours and an increase in fluid loss between about 16 to about 20 hours.

* * * * *